United States Patent
Stevens et al.

(10) Patent No.: US 9,284,754 B2
(45) Date of Patent: Mar. 15, 2016

(54) RESTRAINT DEVICE AND METHOD

(71) Applicants: John R. Stevens, Jacksonville, FL (US); Mark A. Rusco, Jacksonville, FL (US)

(72) Inventors: John R. Stevens, Jacksonville, FL (US); Mark A. Rusco, Jacksonville, FL (US)

( * ) Notice: Subject to any disclaimer, the term of this patent is extended or adjusted under 35 U.S.C. 154(b) by 0 days.

(21) Appl. No.: 14/739,967

(22) Filed: Jun. 15, 2015

(65) Prior Publication Data
US 2015/0315823 A1  Nov. 5, 2015

Related U.S. Application Data

(63) Continuation of application No. 14/201,465, filed on Mar. 7, 2014, now abandoned.

(51) Int. Cl.
*E05B 75/00* (2006.01)
*B60R 22/00* (2006.01)

(52) U.S. Cl.
CPC ............... *E05B 75/00* (2013.01); *B60R 22/00* (2013.01); *B60R 2022/003* (2013.01); *Y10T 70/404* (2015.04)

(58) Field of Classification Search
CPC ..... Y10T 70/404; E05B 75/00; E05B 75/005; B60R 22/00; B60R 2022/003
USPC ............. 70/16; 24/16 PB; 128/869, 874–876, 128/878, 879, 882; 297/466, 468, 485; 119/770, 771, 857; 280/801.1, 801.2, 280/808, 290
See application file for complete search history.

(56) References Cited

U.S. PATENT DOCUMENTS

| | | | | |
|---|---|---|---|---|
| 1,823,697 A | | 9/1931 | Nenstiehl | |
| 2,663,031 A | * | 12/1953 | Kalthoff | A61G 7/10 182/3 |
| 3,007,331 A | | 11/1961 | Irwin | |
| 3,769,938 A | * | 11/1973 | Hudziak | A47D 13/046 119/770 |
| 4,004,583 A | * | 1/1977 | Johnson | A61F 5/3792 128/876 |
| 4,173,974 A | * | 11/1979 | Belliveau | E05B 75/00 128/882 |
| 4,502,194 A | | 3/1985 | Morris | |
| 4,674,303 A | | 6/1987 | Salcone, II | |
| 4,728,553 A | * | 3/1988 | Daniels | A41D 27/245 128/876 |
| 4,789,183 A | | 12/1988 | Wolfer | |
| 4,949,679 A | * | 8/1990 | Wolfer | A61F 5/3723 128/878 |
| 5,031,639 A | * | 7/1991 | Wolfer | E05B 75/00 128/869 |
| 5,261,728 A | * | 11/1993 | Carmichael | B60R 21/12 280/801.1 |

(Continued)

*Primary Examiner* — Lloyd Gall
(74) *Attorney, Agent, or Firm* — Frank J. Ullo, Jr.; William H. Hollimon

(57) ABSTRACT

A restraint device and method for securing an individual in a vehicle is presented. The device increases the safety and security of the individual who is in custody. Further, the device increases the safety for the arresting or attending officer. The device is portable and can be used in a variety of vehicles and properly adapted modes of transportation. As presented the device comprises three belts which coordinate and are sized to secure the individual in a seated position. Once secured with the device, the seated individual who has his hands cuffed behind his back is unable to maneuver his hands to the front of his body. Further, the individual's movements are restricted so that the individual is maintained in a fixed, upright seated position. The connections presented in the device allow for flexibility and ease of use by the user while preventing tampering by the individual being restrained.

16 Claims, 5 Drawing Sheets

(56) References Cited

U.S. PATENT DOCUMENTS

| | | |
|---|---|---|
| 5,345,947 A | 9/1994 | Fisher |
| 5,469,813 A | 11/1995 | Peden |
| 5,542,433 A * | 8/1996 | Saupe .................... A61F 5/3715 128/869 |
| 5,551,447 A | 9/1996 | Hoffman |
| 5,598,812 A * | 2/1997 | Graham ............... A01K 1/0263 119/770 |
| 5,733,014 A | 3/1998 | Murray |
| 5,829,443 A * | 11/1998 | Cunningham ........ A61F 5/3715 128/869 |
| 6,053,580 A | 4/2000 | White, Sr. |
| 6,360,747 B1 | 3/2002 | Velarde |
| 6,431,652 B1 | 8/2002 | Kennedy |
| 6,896,291 B1 | 5/2005 | Peterson |
| 7,270,347 B1 * | 9/2007 | Zlojutro ................ B60R 22/023 280/801.1 |
| 7,712,200 B2 * | 5/2010 | Squires .................... A47C 7/62 128/879 |
| 7,922,254 B2 | 4/2011 | Squires |
| 2005/0166370 A1 | 8/2005 | Miles |
| 2015/0121973 A1 * | 5/2015 | Travers ................... E05B 75/00 70/16 |

* cited by examiner

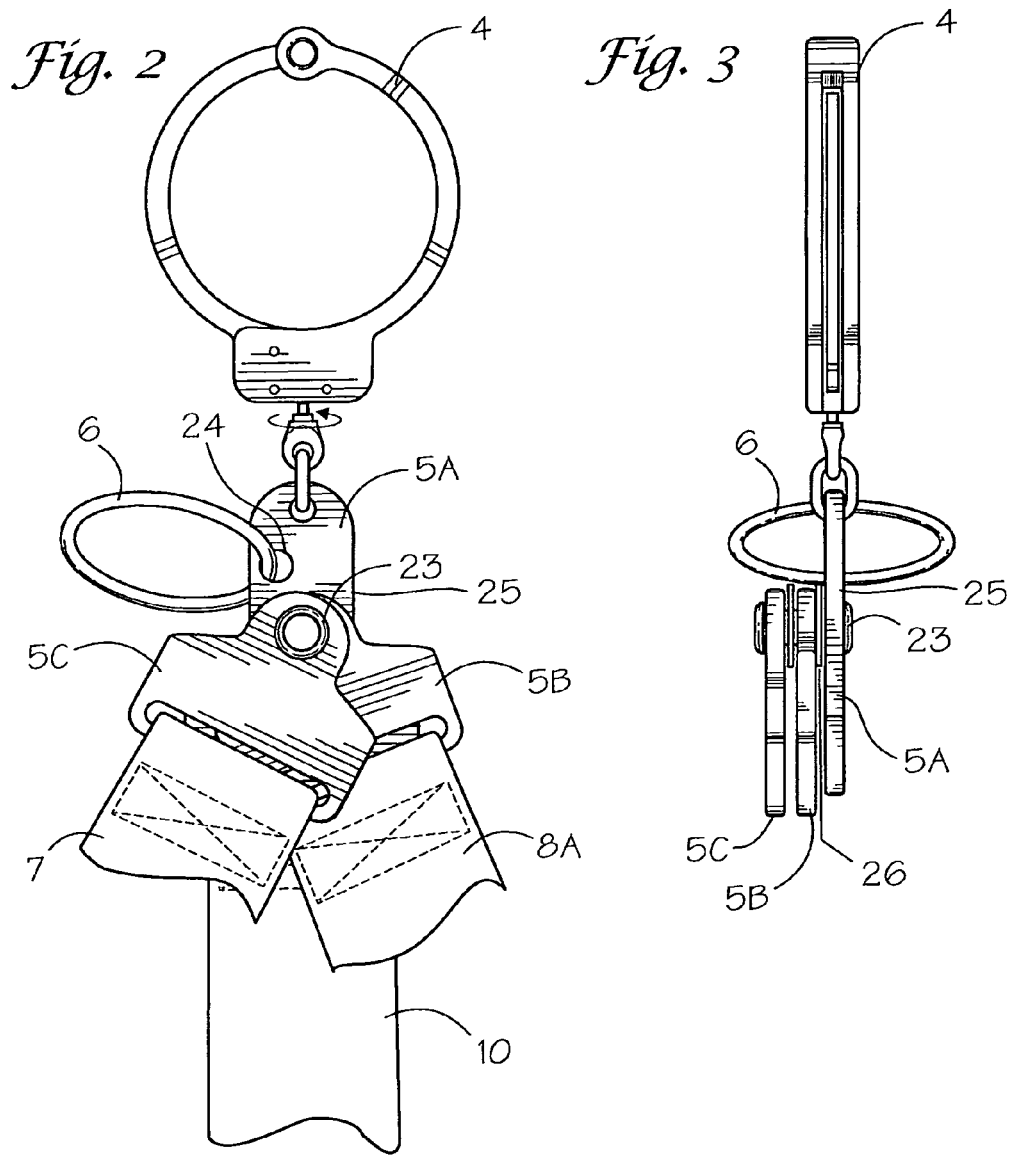

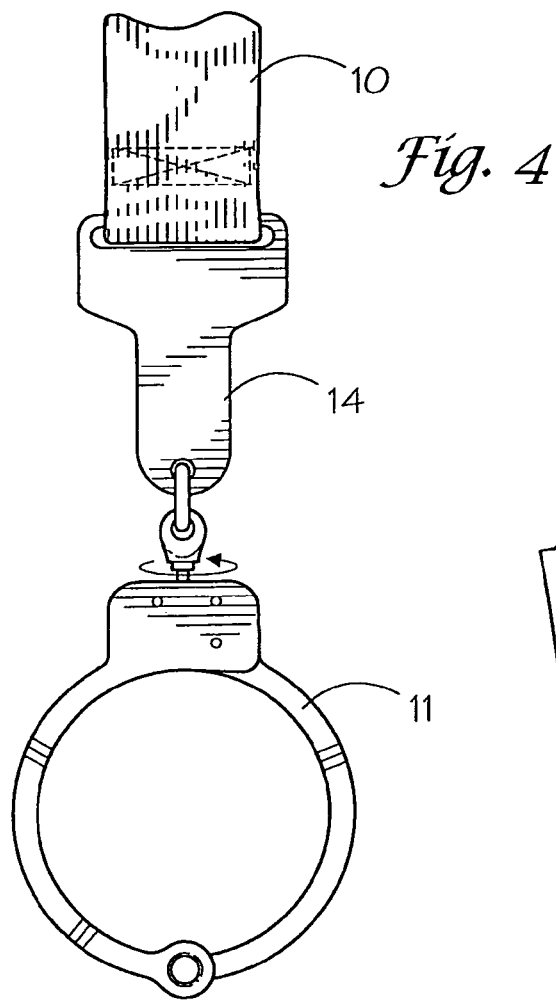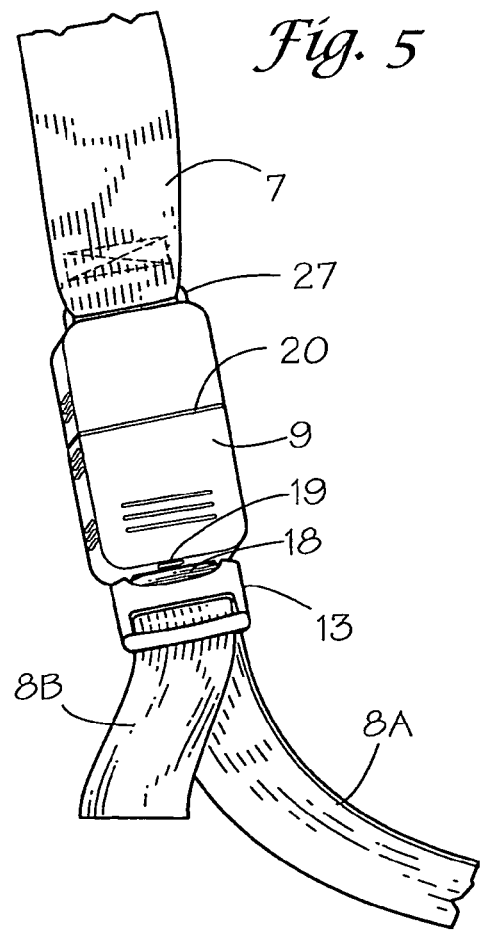

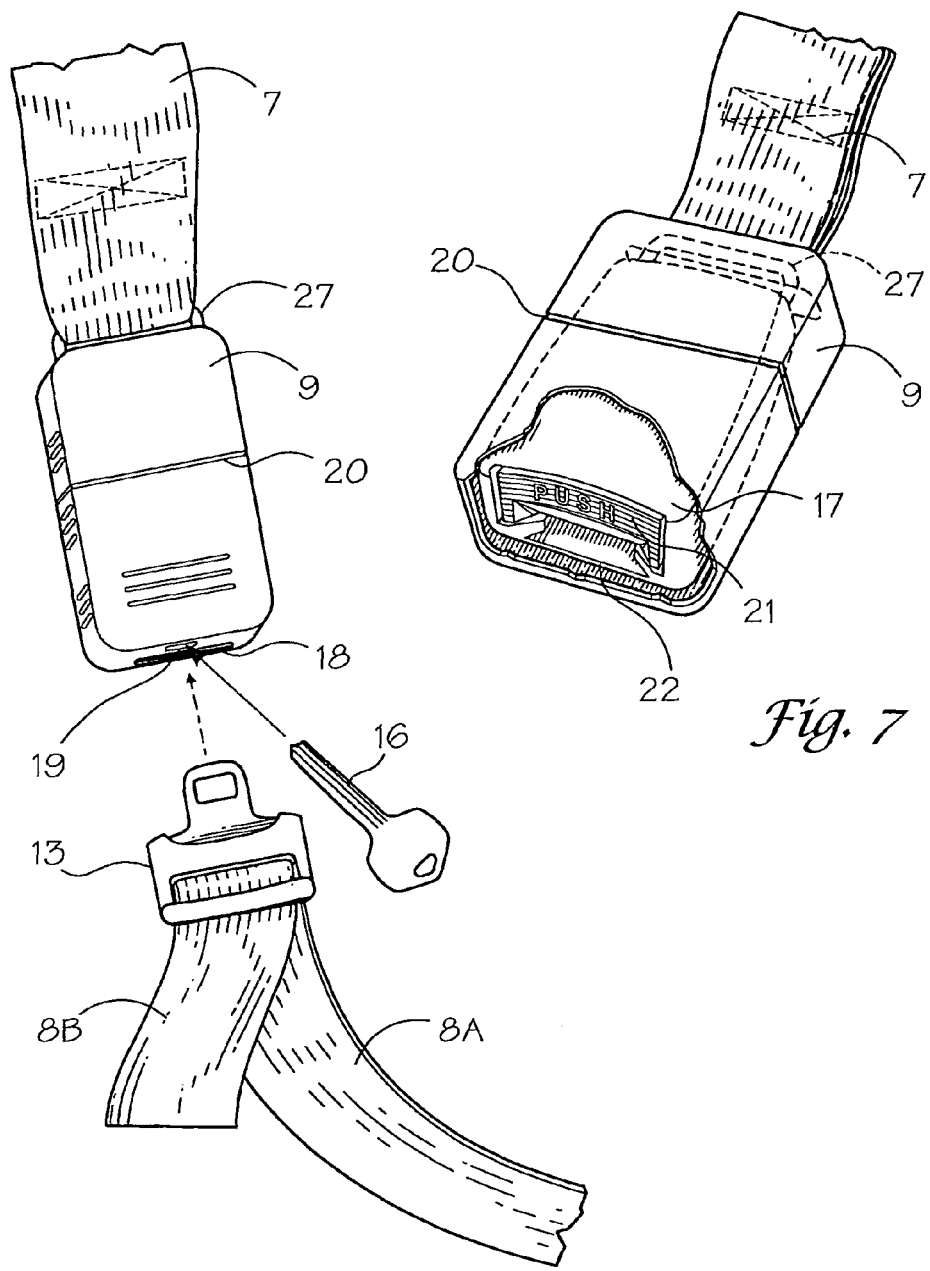

RESTRAINT DEVICE AND METHOD

CROSS REFERENCE TO RELATED APPLICATION

This nonprovisional utility patent application is a continuation of application Ser. No. 14/201,465, entitled "Police Car Restraint System" which was filed on Mar. 7, 2014, pursuant to 35 U.S.C. §120. Application Ser. No. 14/201,465 was expressly abandoned on Aug. 14, 2015.

BACKGROUND

1. Field of Invention

This invention relates generally to the field of restraint systems and more particularly relates to restraint systems for individuals being transported in the rear seat of a police car, detective cruiser, or other modern mode of transportation.

2. Related Art

The transport of an individual such as an arrestee or prisoner in the back seat of a police car is a common occurrence, and in many instances the individual must be restrained. Often the individual is restrained using a pair of handcuffs, the arms of the individual being handcuffed behind the individual's back. In some instances though, a violent or non-cooperative individual requires further restriction, and a restraint device and method are needed to further restrain the individual such that movements from side to side and back and forth are restricted. This is critical for the safety of the officer and the individual being restrained. In the past, multiple devices have been proposed to safely and securely transport individuals. Unfortunately, each of the devices in the related art have disadvantages when compared to the restraint device and method disclosed in the present invention.

The earliest restraining devices for use during prisoner or arrestee transport were disclosed in U.S. Pat. No. 1,823,697 issued to Nenstiehl on Sep. 15, 1931 and U.S. Pat. No. 3,007,331 issued to Irwin on Nov. 7, 1961. More recently, restraint devices for vehicular use were disclosed in U.S. Pat. No. 4,789,183 issued to Wolfer on Dec. 6, 1988 and U.S. Pat. No. 7,922,254 issued to Squires et al. on Apr. 12, 2011.

U.S. Pat. No. 1,823,697 discloses a fixed spring and chain handcuff device which is located and affixed beneath the seats of a vehicle. Working in a similar fashion, U.S. Pat. No. 3,007,331 discloses a rigid member which is fixed to the floor of the vehicle directly in front of the seat. In U.S. Pat. No. 3,007,331, the handcuffs on the individual are locked within a device that is attached to the rigid member to securely hold the individual in his seat during transport. Each of these devices secure the individual to the vehicle and restrict side to side movement to a degree; however, neither of these devices directly secures nor restricts the back and forth movement of the torso of the individual, and both require the individual to position his hands in front of his body.

U.S. Pat. No. 4,789,183 discloses a device and method which improves the prior devices as it secures an individual in the vehicle and prevents him from getting his hands in front, of his body. The device consists of straps that are fixed to the vehicle at alternate points near the seat system. U.S. Pat. No. 7,922,254 discloses a retractable strap that connects to the handcuffs of the prisoner and clinches the prisoner to the seat within the vehicle. The device uses electric magnets with a retractable strap to lock the handcuffed individual in his seat with his hands snugly secured behind his back. As with the devices previously described, these devices are limited in that they do not limit the back and forth movement of the torso of the individual. Furthermore, none of the aforementioned devices have portability for ease of use within multiple vehicles.

In addition to the aforementioned devices which relate to the points of connection to the vehicles, seat belt buckle covers have been disclosed which prevent the buckle release by shielding an individual from the release button. U.S. Pat. No. 4,502,194, issued to Morris et al. and U.S. Pat. No. 4,674,303 issued to Salcone, II, are two devices that were developed for child safety. U.S. Pat. No. 4,502,194 discloses a rigid body housing cover over the safety belt buckle. U.S. Pat. No. 4,674,303 discloses a lockable housing that closes over the top of a safety buckle. Each of these devices was developed to prevent young children from removing seat belts while they are riding in vehicles and are designed to secure the in-place seat belts within vehicles. Neither housing system is permanently molded around the buckle or intended to prevent an adult from releasing the buckle.

SUMMARY

Law enforcement officers are often called upon to transport individuals in the rear of police cars or other vehicles. Under most conditions, an individual is handcuffed with hands behind his back and he is seated in the rear of a vehicle. However, it is too often the case during this process that the individual contemplates and attempts an escape from custody thereby creating conditions where the safety of the arresting or attending officer is compromised or a contentious situation escalates to a point where deadly force is used. Examples of individuals resisting arrest are replete in the daily news reports. In certain cases, an individual runs from the arresting officer before being placed in the vehicle. At other times, an individual maneuvers his handcuffed hands to the front of his body where he can use them as a weapon against the officer. An individual in the rear of a vehicle can also head-butt an officer with extreme force if his upper body is not restrained, or ram his head against and kick windows or the divider between the front and back seats.

When an officer anticipates that an individual will have unruly tendencies or if the individual is under the influence of drugs or alcohol which can cause unsafe conditions for the officer and the individual, the officer may choose to hogtie the individual by securing both the ankles and the wrists of the individual. This method does secure the individual and protects the arresting officer. Under certain circumstances, it also protects the individual from injuring himself. However, multiple studies documented in the American Journal of Medicine and Forensic Pathology report that there can be negative effects of this restraint method on the individual, and even death can be caused by positional asphyxia.

The exemplary embodiments of the present invention have a dual purpose of security and safety for the individual restrained. Further, the embodiments increase the safety for the arresting or attending officer. Moreover, the embodiments provide a device that is portable which can be used in multiple vehicles and vehicle types and adapted for use in other settings.

Regarding the security of the individual restrained, the embodiments restrict the individual's ability to flee from the arresting officer before he is inserted into the vehicle. In the exemplary embodiments an individual can be securely connected to the interior of the vehicle while the officer proceeds to search the individual for weapons, drugs or other objects. In completing this connection, the individual is tethered to the vehicle and is not free to run away from that immediate vicinity of the vehicle. In addition to limiting movement of the individual outside the vehicle, when the individual is seated in the vehicle and fully restrained by the embodiments, his movement within the vehicle is restricted to one seated location. Moreover, the dual connections of the handcuff tether and the torso stabilizer back up each other in securing the individual inside of the vehicle. By adapting the embodiment with a leg restraint device, such as disclosed in U.S. Pat. No. 4,728,553, the movement of the individual can be further restrained.

Regarding the safety of the individual, the embodiments permit an individual to be secured and transported in a sitting position which reduces the possibility of injury. For instance, a hogtied individual not secured to the vehicle may experience greater injury in the event of a collision; whereas an individual restrained by the present invention will not freely move during a collision. Also, the embodiments of the invention and certain adaptations using leg restraints eliminate the possibility of death due to positional asphyxia which has been reported in hogtied cases. Further, an individual under the influence of drugs or alcohol is restricted from actions that may cause injury to himself such as banging his head against windows or other parts of the vehicle. Finally, because the individuals are secured to and inside the vehicle there is less of an opportunity for an escape attempt or a struggle that might escalate matters and result in the use of deadly force.

Regarding the safety of the arresting or officer in charge of individual transport, the embodiments restrict the movements of the individual when he is standing outside and seated within the vehicle. When tethered to the vehicle, should the individual become violent, an officer can step away from him without concern that the individual will escape. Further, the officer will then have time to consider the most appropriate response (e.g., use of a taser gun, allowing the individual to calm down, etc.). When the individual is seated and fully connected inside the vehicle, the embodiments of the invention restrict the movement of the individual's torso and the individual cannot forcibly head-butt an officer. Also, because the individual's hands are fastened behind his back, he cannot maneuver his hands to his front side and use the handcuffs as a weapon. Finally, because the embodiments of the invention largely eliminate the possibility of escape and violent movements, the officer is offered added protections because matters are less likely to escalate to a level that requires the use of deadly force.

In addition to the safety and security benefits, the embodiments of the invention offer a practical solution to a resource need. Many times the transport of prisoners or arrestees is required in vehicles that are not specifically designed for prisoner transport. These vehicles are not outfitted with a divider between the front and rear seats or other pre-installed restraining devices. In these instances, the embodiments of the invention can be readily attached in the rear of these vehicles so long as there are appropriate anchor points which are required to be installed in motor vehicles produced within the last decade under the National Highway Traffic Safety Administration rules Title 49, Sections 571.213 and 571.225.

The exemplary embodiments of the invention provide a restraint system for securing and restricting movement of an individual placed into the back seat of a vehicle, the restraint system comprising a locking attachment member securing the device to the anchor bracket located above and behind the rear seat in modern vehicles, a variable splitter connected to the locking attachment member which expands or contracts according to the size of the individual being restrained and which is integrally connected to restraining belts, a first belt also known as a handcuff tether having an upper end connected to the variable splitter and a lower end to which a prisoner locking member is attached, the prisoner locking member preferably adapted to be locked onto either a pair of handcuffs securing the individual's arms or the individual's arm itself, a second belt of relatively long length having an upper end connected to the variable splitter and a lower free end, a tongue assembly being mounted onto the second belt in a manner allowing the tongue assembly to be repositioned and locked at a point along the second belt to shorten or lengthen the restraining portion of the second belt, and a third belt of relatively short length having an upper end connected to the variable splitter and a lower end to which a keyed latch assembly is attached, the keyed latch assembly being configured to receive the tongue assembly from the second belt.

The keyed latch assembly is a mechanism whereby the tongue assembly cannot be released from the keyed latch assembly without a key or particular instrument, such that the secured individual cannot release the tongue assembly using only hands or fingers. In one embodiment a standard seat belt latch assembly encased within a slotted buckle cover may be utilized, wherein an elongated metal object or the like must be inserted through a slot to release the tongue assembly.

In the exemplary embodiments, with the locking attachment member connected to the anchor bracket, the first, second and third strap members will hang down from the variable splitter on the front of the seatback. To secure the individual the prisoner locking member connected to the first strap member, such as for example one of the locking assemblies of a standard pair of handcuffs, is locked to the handcuffs or onto the individual's arm. The third strap member is then positioned beneath one arm, brought across the torso and then up behind the other arm such that the tongue assembly can be inserted into the keyed latch assembly connected to the second strap assembly. The free end of the third strap is then pulled to tighten the third strap around the individual's torso. To release the individual, the tongue assembly is released from the keyed latch assembly and the prisoner locking member is removed from the individual or the individual's handcuffs. When not in use, the device can be removed from the vehicle by disconnecting the locking attachment member from the anchor bracket for easy storage. Although the exemplary embodiments reference vehicular usage of the device, other settings and methods of use will be readily apparent to those practicing in the art. For instance, when properly outfitted with anchor brackets, the device and method can be employed in aircraft or other means of modality.

BRIEF DESCRIPTION OF THE DRAWINGS

FIG. 2 is a front view of the locking attachment member and the variable splitter.

FIG. 3 is a side view of the locking attachment member and the variable splitter.

FIG. 4 is a front view of the prisoner locking member.

FIG. 5 is a perspective view of the key latch assembly.

FIG. 6 is a perspective view illustrating the key latch assembly and tongue assembly operation with key.

FIG. 7 is a cut-away showing the interior of the key latch assembly.

DESCRIPTION OF THE EXEMPLARY IMPLEMENTATION

Figure 1:
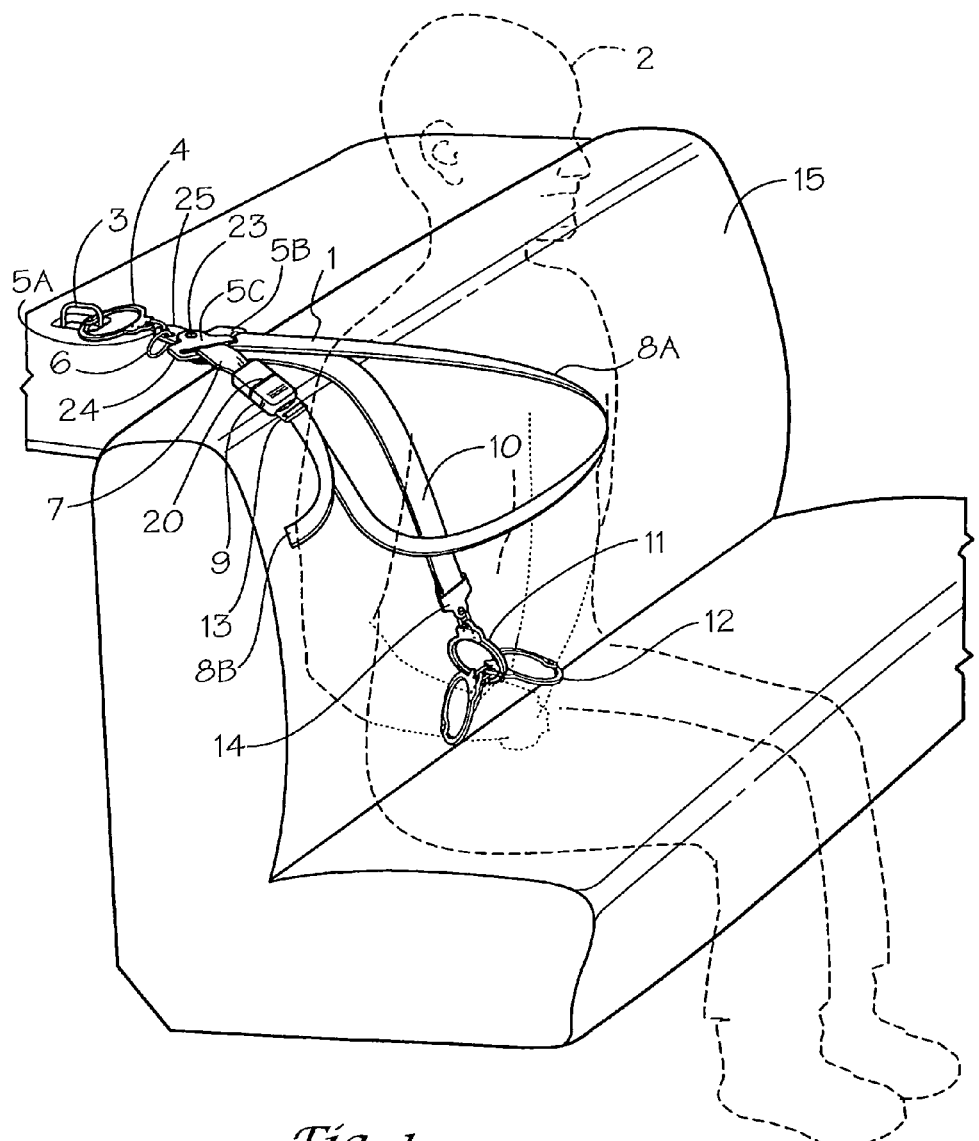
FIG. 1 is a perspective view of an individual being restrained by the device.

Referring now to the drawings, wherein referenced characters designate like or corresponding parts throughout several views, there is shown in FIG. 1, an exemplary embodiment of the device 1. An individual 2 being secured and transported by the device 1 is shown seated in a back-seat 15 of a vehicle. Still referring to FIG. 1, a locking attachment member 4 is shown adapted to secure the device 1 to an anchor bracket 3 located above and behind the rear seat in modern vehicles, whereby the restrained individual 2 is not able to remove the device 1 from the anchor bracket 3. The locking attachment member 4 in this exemplary embodiment comprises a single handcuff that requires a handcuff key to be unlocked. The anchor bracket 3 and the individual 2 and handcuffs 12 shown in FIG. 1 are shown for illustrative purposes only and are not part of the device 1.

Still referring to FIG. 1, a first belt 10, acts as a handcuff tether and is positioned immediately behind and along the center spine of the individual 2 being secured in this embodiment. The first belt 10 has an approximate length of 30 inches which does not allow the individual 2 to maneuver his hands and a pair of handcuffs 12 beneath his legs and to the front of the individual 2. A second belt 8A and 8B has an approximate length of 80 inches and includes a tongue assembly 13 which enables a user to adjust the tightness of the second belt 8A and 8B to accommodate various individual 2 sizes. For instance, if the individual 2 is of a smaller size, a tail 8B of the second belt 8A and 8B will be extended. Consequently, a chest strap 8A, will retract to fit snugly around the individual's 2 chest. A third belt 7 has an approximate length of 12 inches to allow a key latch assembly 9 to be positioned proximate to the top of the back-seat 15 of a vehicle and the anchor bracket 3 when the individual 2 is seated and secured. A variable splitter 25 can accommodate varying sizes of individuals 2 and allow the device 1 to be used on either side of the back-seat 15. Depending on the size of the individual 2 secured, a front plate 5C and a middle plate 5B of the variable splitter 25, which are discussed in detail below and shown in FIGS. 2 and 3, can rotate about a rivet hinge pin 23 from 0 to 90 degrees in either direction when compared to the fixed rear plate 5A. Referring to FIG. 2, for the normal sized individual 2, a 20 to 30 degree angle is typically formed between the centerline of the fixed rear plate 5A and the front plate 5C and the middle plate 5B. Because the front plate 5C and the middle plate 5B are capable of rotation in either clockwise or counter-clockwise directions, the device 1 has the flexibility of use on either the passenger or driver side of the back-seat 15 of a vehicle. In FIG. 1, the key latch assembly 9 and the tongue assembly 13 are shown in a closed position.

Referring to FIGS. 1 and 2, the locking attachment member 4 is shown in a closed position. Referring to FIGS. 2 and 3, the locking attachment member 4 is allowed to pivot and is linked to the variable splitter 25. The variable splitter 25 comprises three plates mated by a rivet hinge pin 23. As shown in FIG. 2, the top of the rear plate 5A links to the locking attachment member 4 and has an aperture 24 to allow the connection of a leg restraint adapter 6. The base of the rear plate 5A has a formed slit to receive and connect to the first belt 10. The middle plate 5B and the front plate 5C are interconnected along the rivet hinge pin 23. Similar to the rear plate, the bases of the middle plate 5B and the front plate 5C have formed slits to connect to a third belt 7 and the chest strap 8A of the second belt 8A and 8B, respectively. As shown in FIG. 3, spacers 26 separate the plates to allow freedom of movement and to reduce friction between the first belt 10, the second belt 8A and 8B and the third belt 7. In FIG. 3, the leg restraint adapter 6 is oriented away from the viewer. Although the variable splitter 25 can rotate 360 degrees at its connection point with the locking attachment member 4, the orientation illustrated in FIGS. 1 and 2, with the front plate 5C on top, is preferable for this exemplary embodiment. As shown, this orientation allows the user (the arresting or attending officer) while standing outside of the vehicle, to interlock the tongue assembly 13 with the key latch assembly 9, tighten the chest strap 8A by pulling the tail 38 of the second belt 8A and 8B, and connecting leg restraints to the leg restraint adapter 6. In this embodiment, the locking attachment 4, the variable splitter 25, the leg restraint adapter 6 and all of the connections shown in FIGS. 2 and 3 are metal.

Referring to FIGS. 1 and 3, the first belt 10 acts as a handcuff tether and connects at its top to the rear plate 5A. The approximate length of the first belt 10 is 30 inches, and as shown in FIGS. 1 and 4, the bottom of the first belt 10 is connected to an interconnect 14 that is linked to a prisoner locking member 11. The top of the interconnect 14 has a slit sized to receive and secure the end of the first belt 10. The prisoner locking member 11 in the exemplary embodiment is a standard handcuff. This gives device 1 and the user flexibility as the prisoner locking member 11 can be attached to the individual's 2 handcuffs 12 as shown in FIG. 1, or attached directly to the arm of the individual 2, if there is no other means of connection available. Additionally, as shown in FIG. 1, in the exemplary embodiment, the prisoner locking member 11 and the locking attachment member 4 are handcuffs for security and to minimize the number and type of keys the user must carry. As shown in FIG. 4, the prisoner locking member 11 and the interconnect 14 are both metal.

Referring to FIGS. 5 and 16, the bottom of the third belt 7 connects to the key latch assembly 9 through a buckle connector 27. The key latch assembly 9 has a housing with grooves for ease of gripping to disengage the key latch assembly 9 from the tongue assembly 13. As shown in FIG. 5, the tongue assembly 13 is inserted into a receiving slot 18 and locks into the key latch assembly 9 to secure the individual 2. Referring to FIGS. 1 and 5, when the tongue assembly 13 and the key latch assembly 9 are interlocked, the tail 8B of the second belt 8A and 8B can be pulled to tighten the chest strap 8A over the individual 2 being restrained. As shown in FIG. 6 to release the tongue assembly 13, a release key 16 is inserted and pushed within a release key slot 19 which is oriented above the receiving slot 18. Simultaneously with the release key 16 being pushed within the release key slot 19, the tongue assembly 13 and the key latch assembly 9 are pulled apart. While a standard key-lock mechanism may be utilized within the key latch assembly 9, the quick release of the individual 2 by direct insertion of the release key 16 and moderate pressure within the release key slot 19 is preferred because it does not require precise key-lock alignment, turning, etc., which can be beneficial if the emergency release of the individual is required.

Referring to FIG. 7, the interior of the key latch assembly is displayed. The bottom of the third belt 7 is connected to a standard safety belt 17 using the buckle connector 27, the safety belt 17 being housed within the key latch assembly 9. The orientation a buckle opening 22, a buckle release 21, and buckle connector 27 of the safety belt 17 must coincide with the locations of the receiving slot 18, the key slot 19, and the end of the third belt 7, respectively. The key latch assembly 9 is formed around the safety belt 17 by sliding two sleeves over the safety belt 17 and welding them together to deter the individual's 2 tampering. In the exemplary embodiment, a weld joint 20 is shown in FIGS. 1, 5, 6 and 7. In the exemplary embodiment, the key latch assembly 9 housing is made of metal.

Next, the restraint method is described with reference to FIGS. 1 and 8. To restrain the individual 2, the user will secure the locking attachment member 4 to the anchor bracket 3 so that the first belt 10, the second belt 8A and 8B, and the third belt 7 will hang down the front of the back-seat 15 (Step S10). With the individual 2 standing outside the vehicle, typically facing to the rear of the vehicle, the user will reach into the vehicle, pull the first belt 10 toward the individual 2, and lock the prisoner locking member 11 to the handcuffs 12 of the individual (Step S20). The user should rotate the individual 2 and carefully seat the individual 2 in the back-seat 15 of the vehicle whereby the first belt 10 is positioned in the middle of the individual's 2 back (Step S30). The user should position the chest strap 8A of the second belt 8A and 8B across the chest of the individual 2 and underneath the individual's 2 arms and interlock the tongue assembly 13 with the key latch assembly 9 which is at the end of the third belt 7 (Step S40). From the outside of the vehicle, the user should pull the tail 8B of the second belt 8A and 8B, until the chest strap 8A is snugly against the individual's 2 chest (Step S50). The user should take care to not overtighten the chest strap 8A so as to cause discomfort due to the positioning of the prisoner locking member 11 and the handcuffs 12. For additional security, if the tail 8B of the second belt 8A and 8B is long enough, the user could secure the tail 8B by closing it within the vehicle door.

If further leg restraint is needed (Step S60: Yes), the user should properly connect a leg restraint system to the leg restraint adapter 6 and the individual's 2 legs. If leg restraint is not needed (Step S60: No), the method is complete and the individual 2 is properly restrained.

Figure 8:
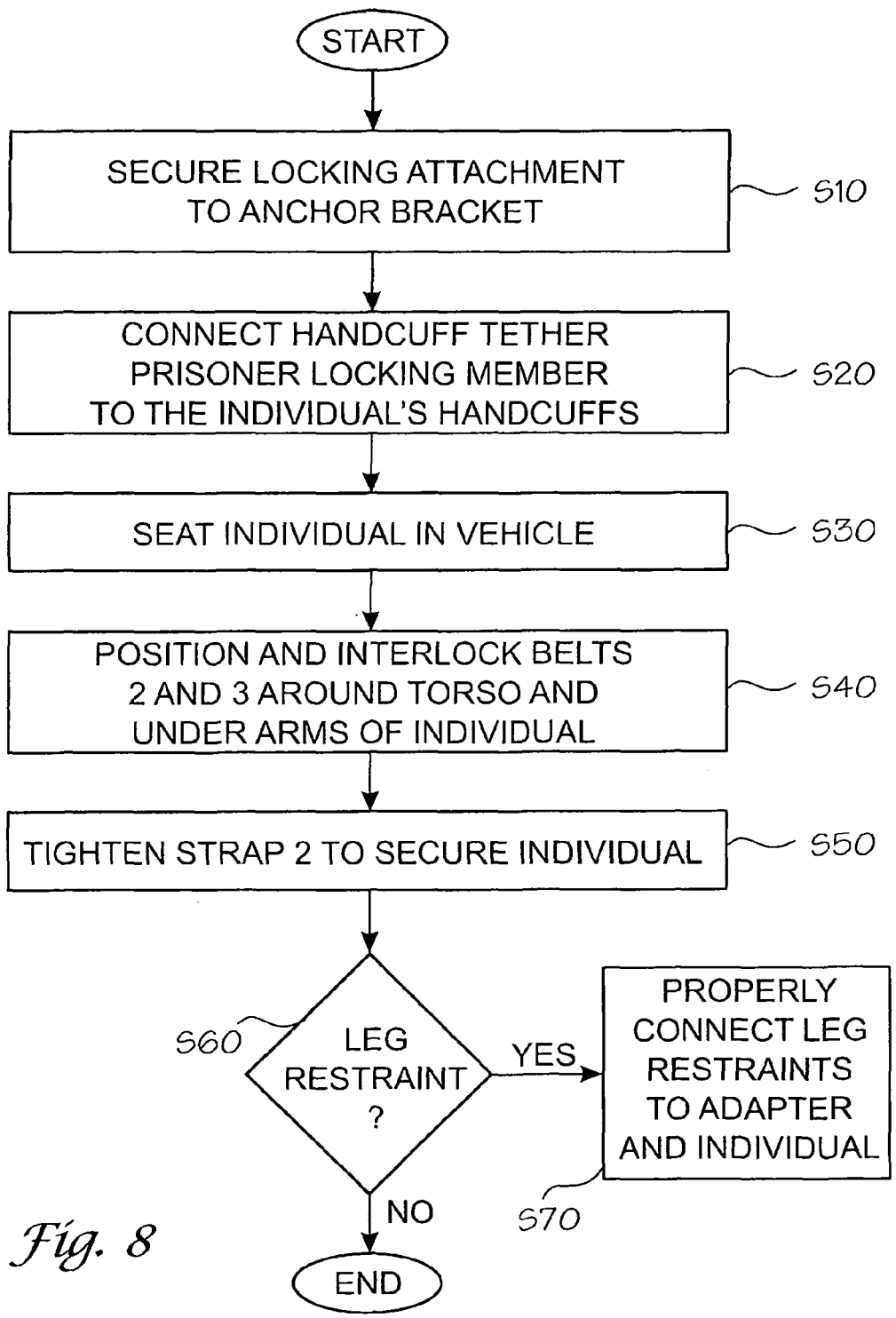
FIG. 8 is a process flow chart for the restraint method.

To release the individual 2 and remove the device 1 from the vehicle, the user should largely reverse the steps shown in FIG. 8; however, the device 1 will need to be unlocked in this process using the release key 16 as shown in FIG. 6 to detach the tongue assembly 13 from the key latch assembly 9, and a standard handcuff key to untether the first belt 10 from the individual's 2 handcuffs 12. Once restraint of the individual 2 is no longer needed, the device 1 can be removed from the vehicle and portably stored by detaching the locking attachment member 4 from the anchor bracket 3.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

For example, a version of the device 1 and method may be presented which is adapted for use in a stationary setting or in aircraft, trains, or other forms of modality. Further, the belts could be interchanged with straps, chains, cables or some other flexible material without adversely affecting the performance of the device 1. Further, the exemplary method and steps of securing and releasing the individual 2 presented here could vary without compromising the security or safety of the user or the individual 2. Additionally, alternative connections to the locking attachment member 4 could be functionally equivalent. Finally additional plates can be added to the variable-splitter 25 for the attachment of additional restraint devices. Therefore, considering these and other various examples, the spirit and scope of the appended claims should not be limited to the description of the preferred versions, operation and method described herein.

What is claimed is:

1. A portable prisoner restraint device for securing an individual in an upright seated position on a seat, comprising:
    a locking attachment member;
    a variable splitter interconnected with the locking attachment member, the variable splitter comprising:
        a first plate pivotally connected with the locking attachment member at an upper end of the first plate;
        a second plate hinged to and adjacent to the first plate; and
        a third plate hinged to the first plate and adjacent to the second plate; and
    being configured to:
        have the first plate interconnect with a first end of a first belt;
        have the second plate interconnect with a first end of a second belt; and
        have the third plate interconnect with a first end of a third belt;
    a key latch assembly interconnected to a second end of the third belt;
    a tongue assembly being configured to:
        interconnect with the second belt;
        move linearly along the second belt;
        interlock with the key latch assembly;
        secure to a fixed position on the second belt and prevent extension of the second belt when the tongue assembly is interlocked with the key latch assembly; and
        release from the key latch assembly; and
    a locking ring member configured to:
        interconnect with a second end of the first belt; and
        link to handcuffs on the individual.

2. The portable prisoner restraint device of claim 1, wherein the first plate of the variable splitter further comprises:
    a receiving slot on a lower end of the first plate being configured to interconnect with the first end of the first belt;
    an aperture being configured to receive an adapter; and
    a rivet oriented perpendicular to and fixed to the first plate, the rivet being configured to:
        hinge the first plate to the second plate; and
        hinge the first plate to the third plate.

3. The portable prisoner restraint device of claim 1, wherein the second plate is configured to connect to the first end of the second belt.

4. The portable prisoner restraint device of claim 1, wherein the third plate is configured to connect to the first end of the third belt.

5. The portable prisoner restraint device of claim 1, wherein the first belt is about 30 inches long.

6. The portable prisoner restraint device of claim 1, wherein the second belt is about 80 inches long.

7. The portable prisoner restraint device of claim 1, wherein the third belt is about 12 inches long.

8. The portable prisoner restraint device of claim 1, wherein the key latch assembly comprises a seat belt buckle kept within a housing.

9. The portable prisoner restraint device of claim 8, wherein the seat belt buckle comprises:
    a receiving channel configured to accept the tongue assembly; and
    a buckle release configured to release the tongue assembly upon depression.

10. The portable prisoner restraint device of claim 9, wherein the housing further comprises:
   a receiving slot configured to align with the receiving channel, wherein the receiving slot is sized to allow the passage of the tongue assembly; and
   a key slot configured proximate to the buckle release, wherein the key slot is sized to only allow depression of the buckle release by an instrument dimensioned to pass through the key slot.

11. The portable prisoner restraint device of claim 8, wherein the housing is made of a material selected from the group of stainless steel, titanium, and brass.

12. The portable prisoner restraint device of claim 1, wherein the locking ring member is a single handcuff.

13. The portable prisoner restraint device of claim 1, wherein the first belt, the second belt and the third belt are made of nylon.

14. A method for a police officer to restrain an individual who is wearing a pair of handcuffs in a vehicle to prevent the individual from moving the pair of handcuffs from his back, underneath his legs, and to the front of his body, and to maintain the individual in a stationary seated position, comprising:
   providing a portable prisoner restraint device comprising:
      a locking attachment member;
      a variable splitter interconnected with the locking attachment member, the variable splitter comprising:
         a first plate pivotally connected with the locking attachment member at an upper end of the first plate;
         a second plate hinged to and adjacent to the first plate; and
         a third plate hinged to the first plate and adjacent to the second plate;
      and being configured to:
         have the first plate interconnect with a first end of a first belt;
         have the second plate interconnect with a first end of a second belt; and
         have the third plate interconnect with a first end of a third belt;
      a key latch assembly interconnected to a second end of the third belt;
      a tongue assembly being configured to:
         interconnect with the second belt;
         move linearly along the second belt;
         interlock with the key latch assembly;
         secure to a fixed position on the second belt and prevent extension of the second belt when the tongue assembly is interlocked with the key latch assembly; and
         release from the key latch assembly; and
      a locking ring member configured to:
         interconnect with a second and of the first belt; and
         link to handcuffs on the individual;
   securing the portable prisoner restraint device to an anchor in the vehicle with the locking attachment member,
   while the individual is standing outside of the vehicle and while grasping the individual wearing handcuffs with one hand, with the other hand, connecting the locking ring member to handcuffs of the individual;
   seating the individual on a back-seat of the vehicle where the locking ring member and the first belt remain behind the individual, wherein the first belt is sized to prevent the individual from maneuvering his hands underneath his legs to his front while in a seated position;
   positioning the second belt under the seated individual's arms and across the seated individual's chest;
   interlocking the tongue assembly of the second belt with the key latch assembly; and
   tightening the second belt and the tongue assembly so that the individual cannot lean forward or otherwise move from an upright seated position.

15. A method for a police officer to restrain an individual as set forth in claim 14, including the step:
   attaching a leg restraint to an adapter to further restrain the legs of the individual.

16. A method for a police officer to restrain an individual as set forth in claim 14, including the steps:
   releasing the individual by using an instrument sized to pass through a key slot that is proximate to a buckle release within the key latch assembly;
   pressing the buckle release with the instrument;
   disconnecting the tongue assembly and the key latch assembly; and
   removing the locking ring member from the handcuffs of the individual.

* * * * *